(12) United States Patent
Miyakawa et al.

(10) Patent No.: US 7,188,695 B2
(45) Date of Patent: Mar. 13, 2007

(54) MOTORCYCLE

(75) Inventors: Futoshi Miyakawa, Wako (JP); Yukiya Ueda, Wako (JP); Katsumi Koyama, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 10/781,370

(22) Filed: Feb. 17, 2004

(65) Prior Publication Data

US 2004/0182633 A1 Sep. 23, 2004

(30) Foreign Application Priority Data

Feb. 26, 2003 (JP) ............... 2003-049015

(51) Int. Cl.
*B62D 11/04* (2006.01)
(52) U.S. Cl. .................................... 180/219
(58) Field of Classification Search ......... 180/219–221
See application file for complete search history.

(56) References Cited

U.S. PATENT DOCUMENTS

| 4,700,799 A | 10/1987 | Kawano |
| 4,723,620 A | 2/1988 | Ono |
| 4,756,547 A | 7/1988 | Treme |
| 4,852,678 A * | 8/1989 | Yamaguchi ............... 180/219 |
| 6,290,017 B1 * | 9/2001 | Ito .............................. 180/227 |
| 6,695,089 B2 * | 2/2004 | Adachi et al. ............ 180/311 |

FOREIGN PATENT DOCUMENTS

| EP | 0 469 475 | 2/1992 |
| GB | 158 616 | 1/1921 |
| GB | 282 114 | 4/1928 |
| JP | 2593868 | 12/1996 |
| JP | 10-329776 | 12/1998 |

OTHER PUBLICATIONS

Anonymous. "Die grosses Fritz W. Egli Story". Retrieved from the Internet: http://www.classic-motorrad.de/winni_sto_01/egli_story.htm. Aug. 25, 2005.
Anonymous. "Honda CB600FW (SF)". Retrieved from the Internet: http://www.fireworks.ru/moto/hornet.htm. Aug. 25, 2005.
Anonymous. "Motorcycles of the 20th Century-Drawings-A small Collection drawings of Classic Motorcycles". Retrieved from the Internet: http://home.planet.nl/~motors-20th-century/drawings.htm. Aug. 25, 2005.

* cited by examiner

*Primary Examiner*—Lesley D. Morris
*Assistant Examiner*—L. Lum
(74) *Attorney, Agent, or Firm*—Hamre, Schumann, Mueller & Larson, P.C.

(57) ABSTRACT

A body structure of a motorcycle. Lengths of front frames are reduced and a size of a cylinder head is reduced in a motorcycle having a form where an engine is used as part of a body frame.

3 Claims, 4 Drawing Sheets

MOTORCYCLE

FIELD OF THE INVENTION

The present invention relates to a body structure of a motorcycle, in which a front frame supporting the front side of an engine can be as short as possible and the strength that is required of a cylinder head can be reduced, in a vehicle having a form where the engine is used as a part of the body frame.

BACKGROUND OF THE INVENTION

A motorcycle in which an engine is used as a part of a body frame is known. For example, there is a motorcycle in which a body frame extends from a head pipe slantingly downward to the rear along an approximately straight line in a side view, and a lower end portion of the body frame is joined to a case of a horizontal opposed engine Japanese Patent Laid-Open Publication No. Heisei 10-329776. Further, there is a motorcycle in which the rear side of a front frame is bifurcated and joined to front and rear portions of a cylinder head of a forward tilted engine Japanese Patent Publication No. 2593868.

In the form where the horizontal opposed engine is supported, the body frame becomes too long and therefore the weight of the body frame increases. Thus, there is a need to reduce the length of the body frame as much as possible from the viewpoint of weight reduction of the body. On the other hand, in the form where the forward tilted engine is supported, the cylinder head is supported. Thus, large force is applied to the cylinder head and therefore it is required to increase strength of the cylinder head by increasing the size thereof, in order to prevent distortion and the like. Thus, the size and weight of the engine are increased by just that much. Therefore, there is a need to reduce the required strength so as to reduce the size and weight of the cylinder head. In addition, there is a need to effectively use the space between the head pipe and the cylinder head by reducing the size and weight of the cylinder head. It is an object of the present invention to realize these needs.

BRIEF SUMMARY OF THE INVENTION

According to the invention, the lower portion of the front frame is joined to the cylinder portion which is integral with the case. Thus, force from the front frame is applied to the case side and is difficult to be applied to the cylinder head side. Therefore, the cylinder head is not easily distorted and strength required in the cylinder head can be reduced accordingly. Moreover, since the front frame is joined to the cylinder block in the upper portion of the case, the length of the front frame can be reduced as much as possible. Consequently, the size of the cylinder head is reduced so that the weight of the engine is reduced, and the center of gravity can be lowered. Furthermore, weight reduction of the body can be realized.

In addition, the joining portions of the front frame to the cylinder portion which is integral with the case project inward so as to overlap the cylinder portion. Thus, the joining portions do not project outward. Accordingly, the width of the engine is not increased, thus keeping the bank angle small.

Also, the joining portions of the front frame to the cylinder portion which is integral with the case are separated in the front and rear sides, and the joining portion in the rear side is positioned higher than the joining portion in the front side. Thus, the length of the front frame is further reduced, thus enabling a weight reduction.

Further, the width of the end portion of the front frame on the side where the cylinder portion is joined is larger than the width of the end portion of the front frame on the side of the head pipe. Thus, the front frame can efficiently receive vibration of the engine.

Finally, in the side view, the front frame is bent to be convex upward and rearward and overlaps the cylinder head. Thus, when the radiator is placed in front of the engine, even if the cylinder head is placed in the vicinity of the radiator, it is possible to allow the front frame not to interfere with the radiator. Therefore, a degree of freedom for placing the radiator in a space under the front frame can be increased.

DETAILED DESCRIPTION OF THE INVENTION

Figure 1:
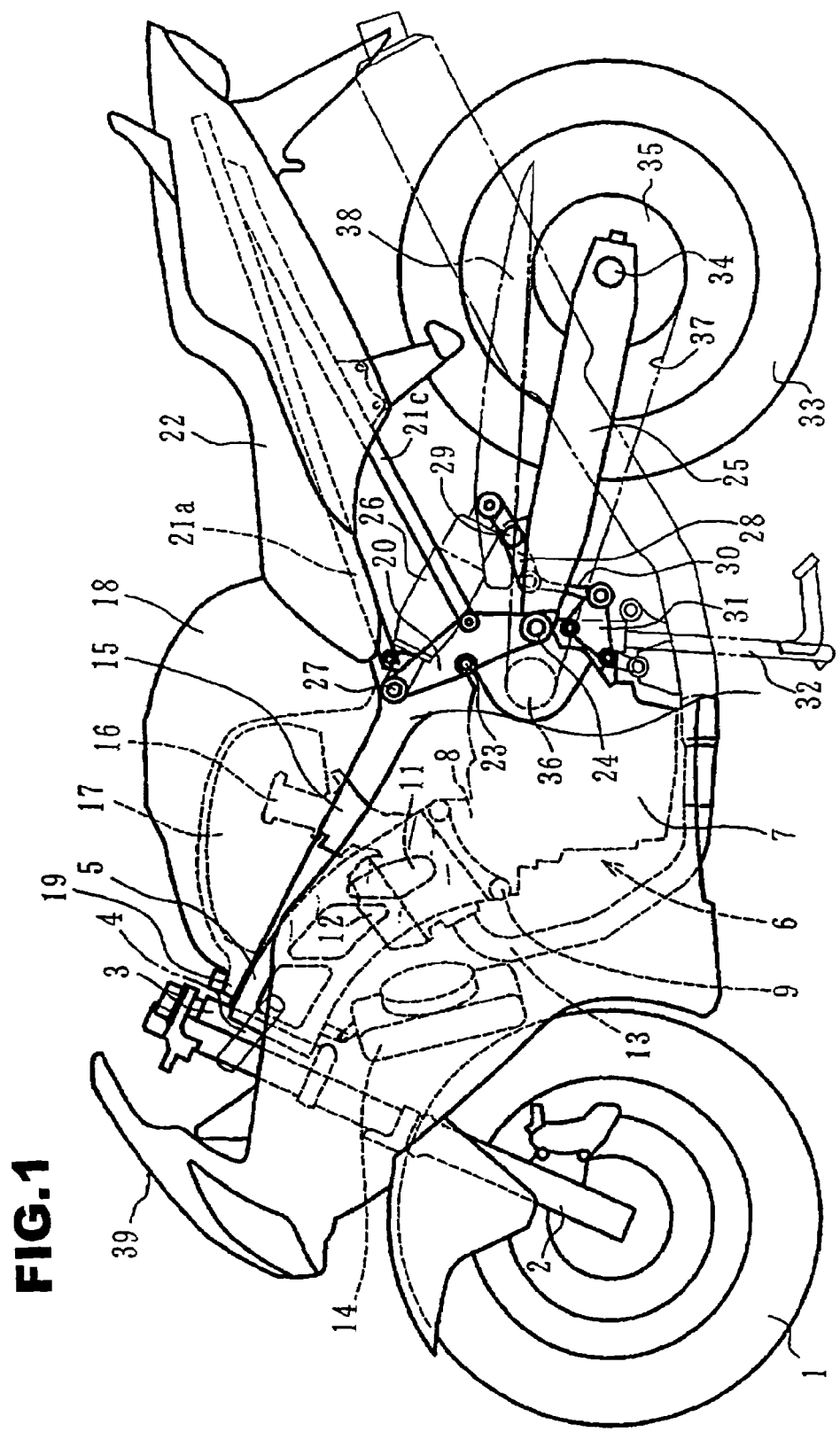
FIG. 1 is a side view of an entire motorcycle to which the present invention is applied.
Figure 2:
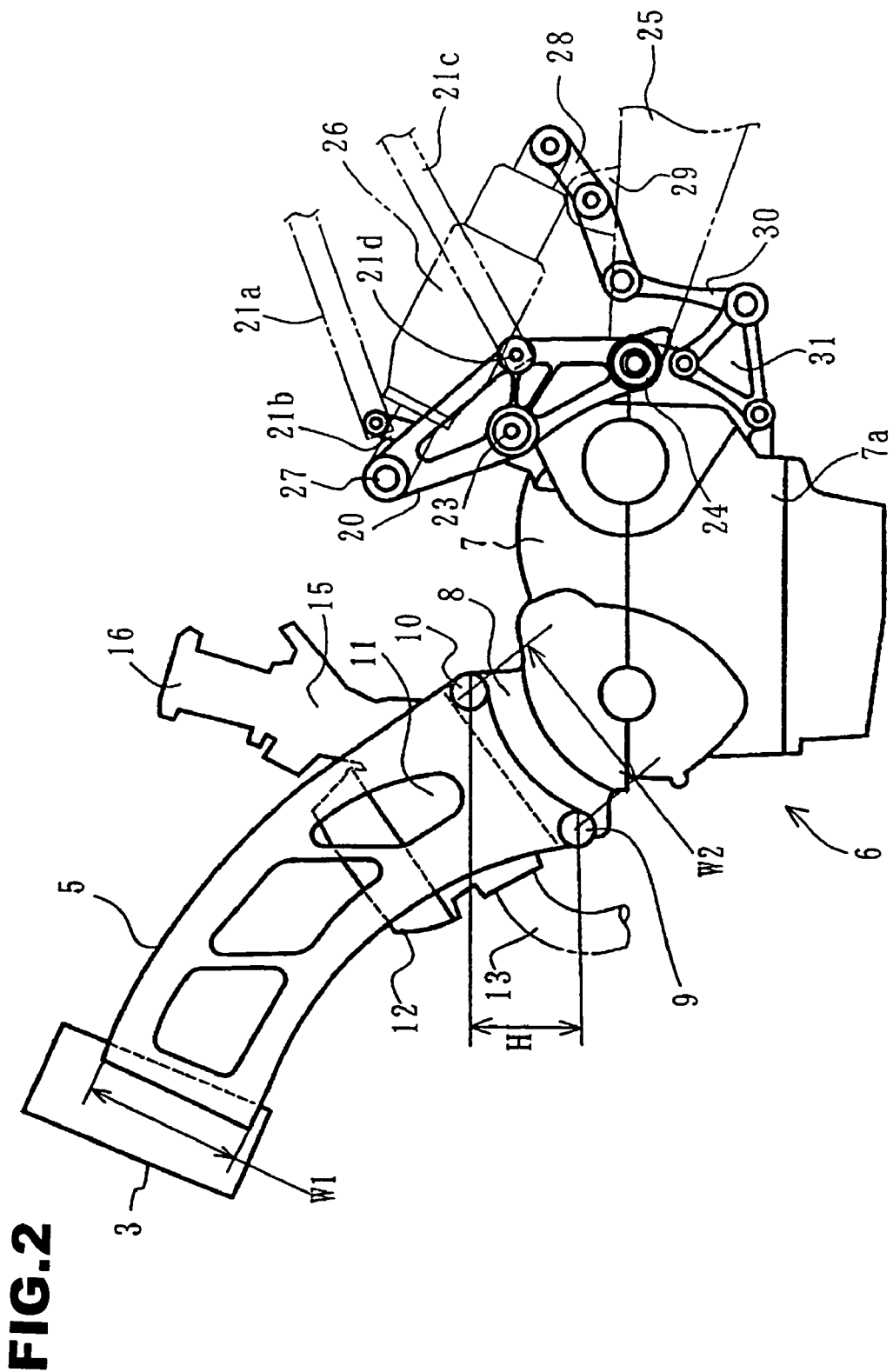
FIG. 2 is a side view of a body frame including an engine.
Figure 3:
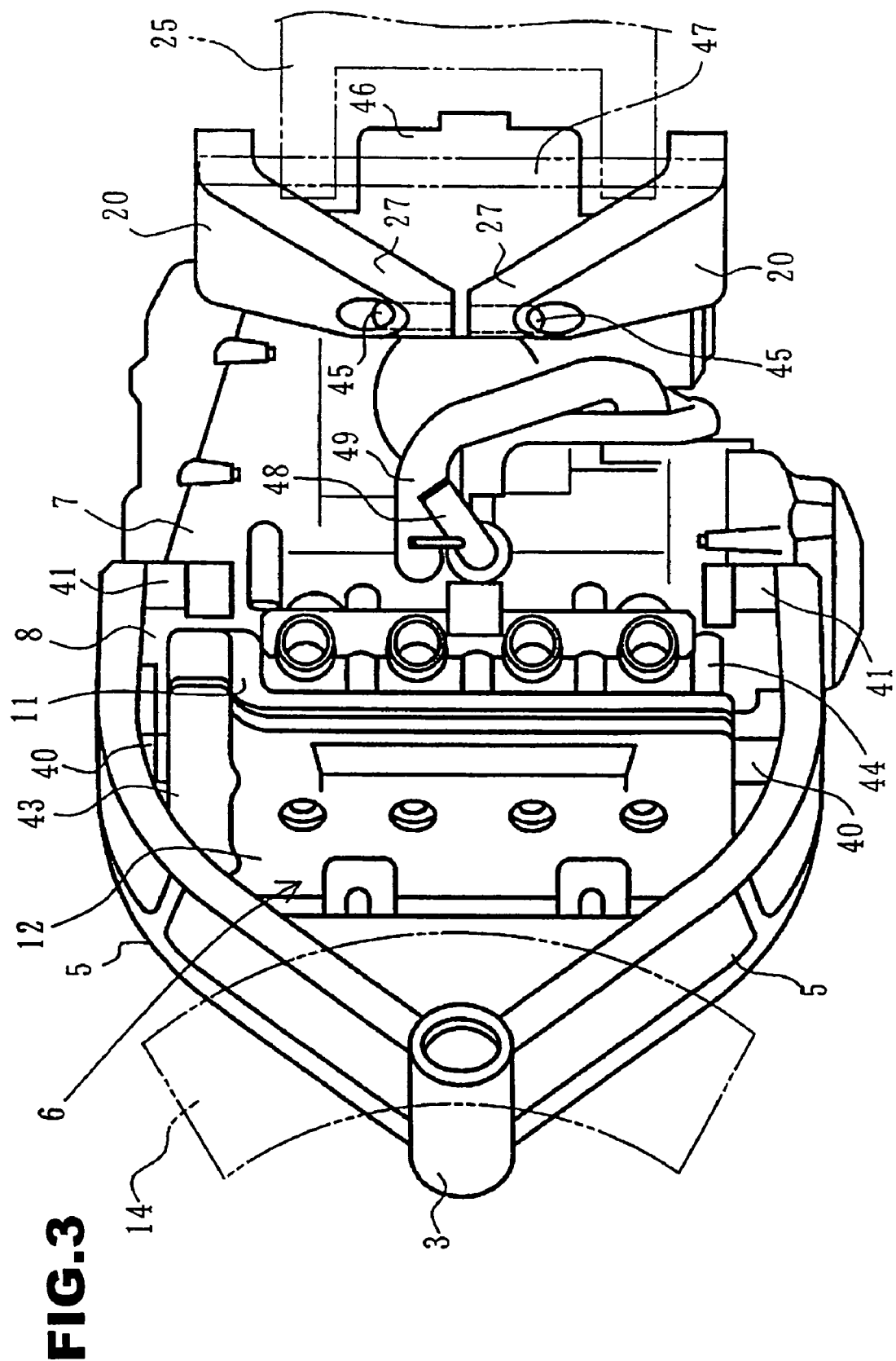
FIG. 3 is a plan view of the body frame including the engine.
Figure 4:
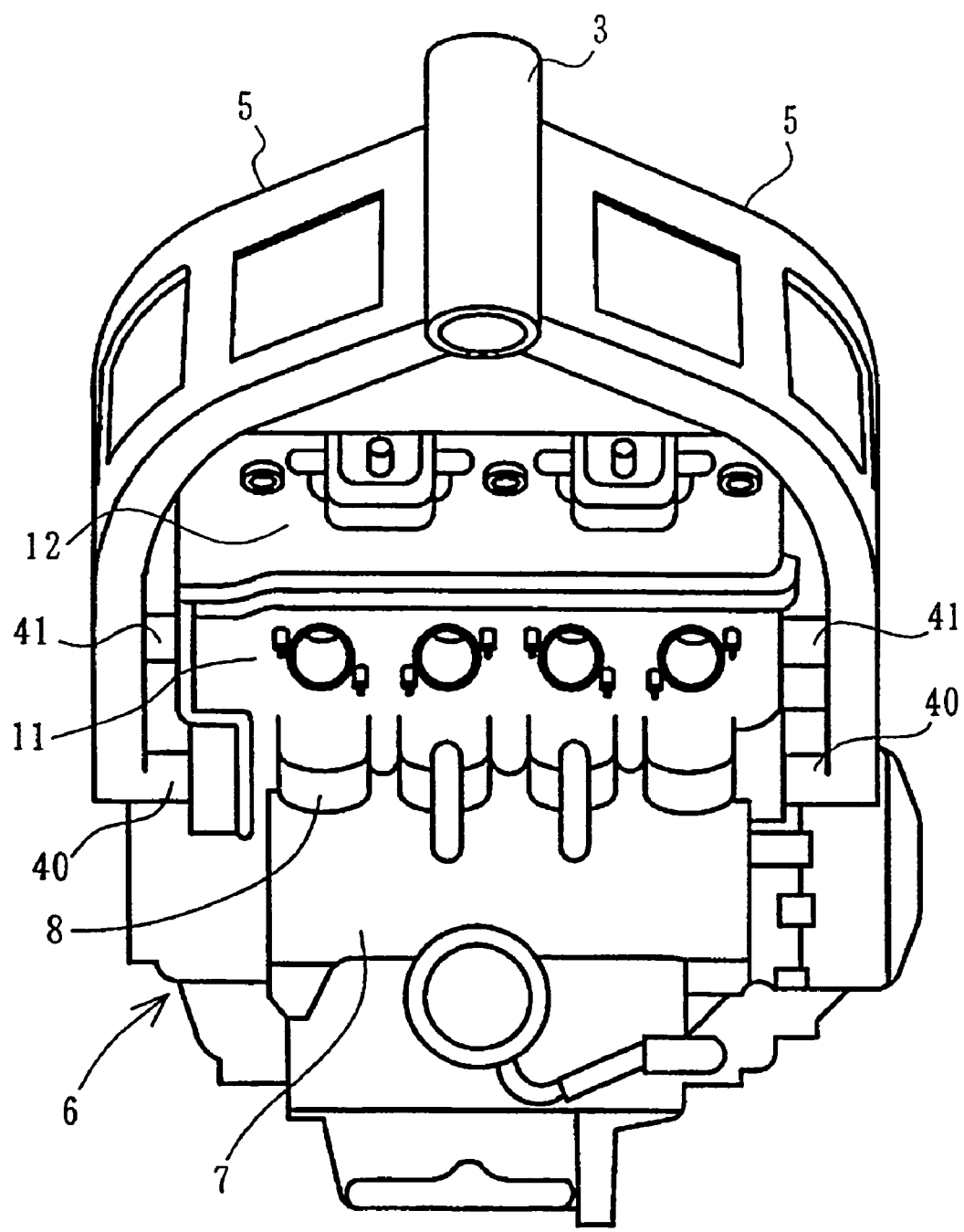
FIG. 4 is a front view of the body frame including the engine.

Hereinbelow, an embodiment is described based on the drawings. FIG. 1 is a side view of an entire motorcycle to which the present invention is applied, FIG. 2 is a side view of a body frame including an engine, FIG. 3 is a plan view of the same, and FIG. 4 is a front view of the same.

First of all, the entire structure of the motorcycle is briefly described with reference to FIG. 1. The upper end of a front fork 2 supporting a front wheel 1 is rotatably supported by a head pipe 3 and steered by a handle 4. Front frames 5 extend from the head pipe 3 slantingly downward to the rear, and the lower end portions of the frames 5 are joined to a cylinder block 8 by front side joining portions 9 and rear side joining portions 10. The cylinder block 8 is formed on the upper portion of a case 7 which constitutes a water cooled four stroke engine 6.

When viewed from the side as shown in the drawing, the front frames 5 overlap the sides of a cylinder head 11 and a cylinder head cover 12. An exhaust pipe 13 extends to the front from an exhaust port which is opened to the front portion of the cylinder head 11. A radiator 14 is placed in a space surrounded by this exhaust pipe 13, the front fork 2 and the front frames 5, and supported by being hung down under the front ends of the front frames 5. The radiator 14 is tilted downward to the rear, and the front end portion of the cylinder head cover 12 comes close to the middle portion in a top to bottom direction on the back surface of the radiator 14. The exhaust pipe 13 is in the proximity to the lower portion of the back surface of the same.

A throttle body 15 configuring a fuel injection system is connected to an intake port which is opened to the rear portion of the cylinder head 11. The intake port intakes air in a downdrafting manner from an intake funnel 16 which extends upward. The intake funnel 16 projects into an air cleaner 17, and the air cleaner 17 is accommodated in a space formed under the front side of a fuel tank 18. The front end portion of the fuel tank 18 is attached to the upper front end portions of the front frames 5 by a stay 19.

The bottom portion of the fuel tank 18 on the rear side thereof is supported on seat rails 21a connected to the upper portions of rear frames 20. A seat 22 placed on the rear side of the fuel tank 18 is supported on the seat rails 21*a*. Reference numeral 21*b* denotes stays which connect the front end portions of the seat rails 21*a*. Reference numeral 21*c* denotes back stays placed under the seat rails 21*a*, respectively.

The rear frames 20 have an approximate rhombus shape when viewed from the sides and are joined to the upper portion of the case 7 on the rear end side thereof by mounts 23 in the middle portions of the rear frames 20 in a top to bottom direction. The lower end portions of the rear frames 20 support the front end portions of rear swing arms 25 swingably in an up and down direction at pivot portions 24. A rear cushion 26 constituting a rear wheel suspension is placed, lying in a front and rear direction. The front end portion of the rear cushion 26 is supported by upper end portions 27 of the rear frames 20, and the rear end portion thereof is supported in the vicinity of the pivots 24 of the rear swing arms 25 through first link arms 28.

The first link arms 28 are swingably supported by the rear swing arms 25 at middle portions 29. The front end portions of the first link arms 28 are supported by stays 31 extending rearward from the rear end of the case 7, by using second link arms 30. In the vicinity of the stays 31, a main stand 32 is rotatably attached to the case 7.

A rear wheel 33 is supported at the rear end portions of the rear swing arms 25 and driven by a chain 37 running between a driven sprocket 35 which is coaxial with an axle 34 and an output sprocket 36 on the side of the case 7. The chain 37 on the upper side of the rear swing arm 25 is covered with a chain case 38 placed on the rear side of the case 7.

Referential numeral 39 denotes a fairing. A gap is formed between the fairing 39 and the lower portion of the fuel tank 18, and a part of the throttle body 15 is seen through the gap.

As shown in FIG. 2, the joining portions of the front frames 5 to the engine side are formed in the upper end portion of the cylinder block 8 in the vicinity of a boundary portion between the cylinder head 11 and the engine 6. Among those joining portions, the front side joining portions 9 are formed in the upper portion of the front end of the cylinder block 8, and the rear side joining portions 10 are formed in the upper portion of the rear end of the cylinder block 8.

Moreover, the engine 6 tilts forward, and the contact surface between the cylinder block 8 and the cylinder head 11 is tilted downward to the front. As a result, the rear side joining portions 10 are higher than the front side joining portions 9 by a dimension H. In addition, a width W2 of the end portion of each of the front frames 5, which is the joining portion to the cylinder block 8, is larger than a width W1 of the end portion of the same, which is joined to the head pipe 3. Thus, the width of each of the front frames 5 becomes larger gradually from the front end to the rear end thereof.

The case 7 is constructed to be split into top and bottom portions. The position where a pivot shaft of the pivots 24 is put through is lower than a split plane 7*a*, so the pivot shaft is placed on the side with larger rigidity.

Stays 21*b* are attached to the rear portions on the upper sides of the rear frames 20 which are connected to the case 7, and the stays 21*b* join the front ends of the seat rails 21*a*. Joining portions 21*d* under the stays 21*b* are joined to the front end portions of back stays 21*c*.

As shown in FIG. 3, both the front frames 5 and the rear frames 20 are provided as pairs on the right and left, and respectively obtained by casting or forging by the use of appropriate metal such as an aluminum alloy or the like.

Bosses 40 and 41 are provided in the rear end portions of the front frame 5 in inward directions, projecting toward the inside of the body. The bosses 40 are portions which are integral with the front side joining portions 9, and the bosses 41 are portions which are integral with the rear side joining portions 10.

The bosses 41 project to the inside of the body in a plan view as shown in the drawing. The bosses 41 overlap the cylinder block 8 and are engaged with the cylinder block 8 in the overlapping portions by inserting bolts from the sides of the body. As a result, the joining portions do not project outward in a body width direction.

The engine 6 is a four stroke transverse-mounted in-line four cylinder, and a cam chain case 43 is formed on the right side of the engine 6 in the body. The cam chain case 43 and the boss 41 which is positioned in the rear of the cam chain case 43 are in a positional relationship to overlap each other when viewed in the front and rear direction. Further, the boss 41 is positioned at the rear of the upper portion of a water jacket 44 in the left side in the body. The boss 41 and the water jacket 44 are in a positional relationship to overlap each other when viewed in the front and rear direction. Therefore, the bosses 41 do not project outward in the body width direction. The center portion of the radiator 14 to which the water jacket 44 is connected is bent to be convex rearward.

The upper portions of the rear frames 20 are inclined toward the center of the body, and right and left upper end portions thereof come close to each other in the vicinity of the center of the body. Attaching holes 45 are formed in the upper end portions 27 respectively, and the upper end portion of the rear cushion 26 is supported by a bolt inserted through the attaching holes 45.

The center of the rear end of the engine 6 is configured as a pivot shaft boss 46. The front ends of the rear swing arms 25 are supported by a pivot shaft 47 which is inserted through the aligned through holes of the pivot portions 24 in the right and left rear frames 20. Reference numeral 48 in FIG. 3 denotes a cooling water hose and Reference numeral 49 denotes a joint pipe of the hose.

As shown in FIG. 4, the respective bosses 40 of the right and left front side joining portions 9 project to the inside of the body and overlap the cylinder block 8. The front side joining portions 9 are engaged with the cylinder block 8 by inserting bolts through the bosses 40 from the sides of the body so that the joining portions do not project to the outside of the body. Further, the upper end portion of the cylinder head cover 12 is positioned lower than the lower end of the head pipe 3.

Next, effects of this embodiment are described. As evident in FIG. 2 and the like, the body frame is constructed by the front frames 5, the rear frames 20 and the engine 6. Thus, the engine 6 having high rigidity is used as a part of the body frame, thereby reducing the size and weight of the body frame excluding the engine 6. Further, since the body frame is not present above the case 7 of the engine, a large space is formed between the case 7 and the fuel tank 18. Therefore, if the space is used for arranging various kinds of parts, the parts can be easily arranged and maintainability of the parts arranged in the space is improved.

In addition, by using the front side joining portions 9 and the rear side joining portions 10, the lower portions of the front frames 5 are joined to the cylinder block 8 which is integral with the case 7. Thus, force applied from the front frames 5 is applied from the cylinder block 8 to the side of the case 7 which is integral with the cylinder block 8, and it becomes difficult for the force to be applied to the side of the cylinder head 11. Therefore, the cylinder head 11 is not easily distorted and the strength required in the cylinder head 11 can be reduced accordingly. Moreover, the front frames 5 are joined to the cylinder block 8 which forms the upper portion of the case 7. Thus, the lengths of the front frames 5 can be reduced as much as possible. Consequently, the size of the cylinder head 11 is reduced so that the weight of the engine is reduced, and the center of gravity can be lowered. Further, the weight reduction of the body can be realized.

Moreover, the bosses 40 and 41 configuring the joining portions of the front frames 5 to the cylinder block 8 project inward so as to overlap the cylinder block 8. Thus, the front side joining portions 9 and the rear side joining portions 10 do not project outward. Accordingly, the width of the engine 6 is not increased, thus maintaining a small bank angle.

Furthermore, the front side joining portions 9 and the rear side joining portions 10 of the front frames 5 to the cylinder block 8 are separated to the front and rear. At the same time, the rear side joining portions 10 are at positions higher than the front side joining portions 9 by the dimension H. Thus, the lengths of the front frames 5 can be further reduced, realizing weight reduction.

In addition, the end widths W2 of the rear end sides of the front frames 5, which are joined to the cylinder block 8 which is an input side of vibration of the engine, are larger than the end widths W1 of the front end sides of the front frames 5, which are joined to the head pipe 3. Thus, the front frames 5 can efficiently receive vibration of the engine.

Further, in a side view as shown in FIG. 1, the front frames 5 are bent to be convex upward and rearward, and overlap the cylinder head 11 and the cylinder head cover 12. Thus, when the radiator 14 is placed in front of the engine 6, even if the cylinder head 11, the cylinder head cover 12 and the exhaust pipe 13 are placed in the vicinity of the radiator 14, it is possible to allow the radiator 14 not to interfere with the front frames 5. Therefore, a degree of freedom for placing the radiator 14 in the space under the front frames can be increased.

Note that the present invention is not limited to the foregoing embodiment and can be modified and employed in various manners within the principle of the invention. For example, the cylinder portion, where the front frames 5 are joined, only needs to be a portion integral with the case 7. Thus, in a case where the cylinder head is integral with the case 7, the portion may be the cylinder head.

What is claimed:

1. A motorcycle having front and rear wheels, said front wheel being steerably supported by a front fork with a head pipe, said rear wheel having suspension, said motorcycle comprising:

an engine having a front portion and a rear portion, said engine being provided with a case and a cylinder block formed on an upper portion of said case, said engine including a cylinder head attached to said cylinder block, said cylinder head and said cylinder block forming a contact surface, said engine tilting forward so that said contact surface tilts downward;

a front frame connecting the front portion of said engine with said head pipe, said front frame having a first end portion connected to said head pipe, a second end portion connected to the front portion of said engine via a front side joining portion and a rear side joining portion, and a middle portion between said first and second end portions; said front side joining portion and said rear side joining portion being formed adjacent an upper end portion of said cylinder block near the contact surface between said cylinder head and said cylinder block, with said front side joining portion being formed adjacent an upper portion of a front end of said cylinder block and the rear side joining portion formed adjacent an upper portion of a rear end of said cylinder block, said rear side joining portion being higher than said front side joining portion; and said front and rear side joining portions each have an integral boss that protects inwardly from said second end portion of said front frame toward and into engagement with the cylinder block; and a rear frame which is separate from said front frame connecting the rear portion of said engine with said suspension of said rear wheel;

wherein said front and rear frames joined to said engine form a body frame for said motorcycle.

2. The motorcycle in accordance with claim 1, wherein in a side view said second end portion of said front frame is wider than said first end portion.

3. The motorcycle in accordance with claim 1, wherein the middle portion of said front frame is convex upward and rearward and in a side view said front frame overlaps the cylinder head and said motorcycle has a radiator placed between said head pipe and the cylinder head.

* * * * *